United States Patent
Fontanot

(10) Patent No.: US 9,841,753 B2
(45) Date of Patent: Dec. 12, 2017

(54) MONITORING SYSTEM OF A DYNAMICAL ARRANGEMENT OF PIECES TAKING PART IN A PROCESS RELATED TO A MANUFACTURING EXECUTING SYSTEM

(75) Inventor: Paolo Fontanot, Monfalcone (IT)

(73) Assignee: SIEMENS AKTIENGESELLSCHAFT, Munich (DE)

(*) Notice: Subject to any disclaimer, the term of this patent is extended or adjusted under 35 U.S.C. 154(b) by 1097 days.

(21) Appl. No.: 12/966,308

(22) Filed: Dec. 13, 2010

(65) Prior Publication Data

US 2011/0141266 A1 Jun. 16, 2011

(30) Foreign Application Priority Data

Dec. 11, 2009 (EP) ..................... 09178782

(51) Int. Cl.
*H04N 9/47* (2006.01)
*H04N 7/18* (2006.01)
*G05B 19/418* (2006.01)

(52) U.S. Cl.
CPC ............ *G05B 19/4183* (2013.01); *G05B 2219/24097* (2013.01); *G05B 2219/24215* (2013.01); *G05B 2219/24216* (2013.01); *Y02P 90/10* (2015.11); *Y02P 90/12* (2015.11); *Y02P 90/22* (2015.11)

(58) Field of Classification Search
USPC ..................... 348/86, 143, E7.085
See application file for complete search history.

(56) References Cited

U.S. PATENT DOCUMENTS

| 5,056,046 | A | 10/1991 | Mutchler et al. |
| 6,418,351 | B1* | 7/2002 | Martin ................ 700/108 |
| 6,671,570 | B2* | 12/2003 | Schulze ............... 700/121 |
| 7,016,080 | B2 | 3/2006 | Edgar |

(Continued)

FOREIGN PATENT DOCUMENTS

| CN | 1766771 A | 5/2006 |
| CN | 101553763 A | 1/2009 |

(Continued)

OTHER PUBLICATIONS

Machine translation of FAHRNER et al.(WO 03009245 A1).*

*Primary Examiner* — Christopher S Kelley
*Assistant Examiner* — Ana Picon-Feliciano
(74) *Attorney, Agent, or Firm* — Laurence Greenberg; Werner Stemer; Ralph Locher

(57) ABSTRACT

A monitoring system of a dynamical arrangement of pieces takes part in a process related to a manufacturing executing system is presented. At least one of the pieces is spatially movable and the arrangement is free of interfacing signals for signaling a spatial position of the pieces at a control unit of the manufacturing executing system. The monitoring system contains a camera which is spatially positionable in a free selected neighborhood closed to predefined pieces and which acquires an image of a field of interest of the dynamical arrangement, a motion detection unit at an output of the camera that provides a detection of a spatial motion of one of the pieces, and an interface at the output of the camera for transmitting the acquired image to an input of a monitoring unit to extract information on a status of the arrangement which is interpretable in the control unit.

11 Claims, 3 Drawing Sheets

(56) References Cited

U.S. PATENT DOCUMENTS

| | | |
|---|---|---|
| 7,640,070 B2 * | 12/2009 | Chang et al. ................. 700/110 |
| 8,607,307 B2 | 12/2013 | Chand et al. |
| 2002/0186302 A1 * | 12/2002 | Pulkinnen ................ 348/207.99 |
| 2005/0010311 A1 * | 1/2005 | Barbazette et al. ............ 700/78 |
| 2006/0259154 A1 | 11/2006 | Hood et al. |
| 2008/0074540 A1 * | 3/2008 | Liu ............................... 348/474 |
| 2008/0097629 A1 * | 4/2008 | Weatherhead et al. ......... 700/67 |
| 2009/0201379 A1 * | 8/2009 | Schultz et al. ........... 348/207.11 |
| 2009/0210071 A1 * | 8/2009 | Agrusa et al. .................... 700/9 |
| 2009/0234482 A1 * | 9/2009 | Ide ............................... 700/100 |
| 2009/0276072 A1 * | 11/2009 | Grove et al. .................... 700/99 |

FOREIGN PATENT DOCUMENTS

| | | |
|---|---|---|
| WO | 0225928 A2 | 3/2002 |
| WO | 03009245 A1 | 1/2003 |
| WO | WO 03009245 A1 * | 1/2003 |
| WO | 2008048191 A2 | 4/2008 |
| WO | WO 2008048191 A2 * | 4/2008 |

* cited by examiner

MONITORING SYSTEM OF A DYNAMICAL ARRANGEMENT OF PIECES TAKING PART IN A PROCESS RELATED TO A MANUFACTURING EXECUTING SYSTEM

CROSS-REFERENCE TO RELATED APPLICATION

This application claims the priority, under 35 U.S.C. §119, of European application EP 09178782, filed Dec. 11, 2009; the prior application is herewith incorporated by reference in its entirety.

BACKGROUND OF THE INVENTION

Field of the Invention

The present invention relates to a monitoring system of a dynamical arrangement of pieces taking part in a process related to a manufacturing executing system (MES).

1.1 Importance of Equipment Efficiency

Manufacturing companies, to safeguard their competitiveness and cost-effectiveness pay special attention to the efficient use of their assets. The goal is to increase productivity and reduce costs. In many cases the equipment involved for example in a production process controlled by a manufacturing executing system (MES) represent big assets and major investments for the company and running them efficiently is generally important. Often some equipment can represent a bottleneck or cause another kind of drawback for the manufacturing process: in this case it is vital to guarantee a maximal efficiency for such equipment because the throughput of the entire production process is constrained by the result of the operations running there. On these bottlenecks it is required to constantly monitor the efficiency of the equipment and to implement as soon as possible the right corrective actions in case of deviations from the optimal value.

1.2 Measuring the Equipment Efficiency with an Indicator "OEE"

In production processes where equipment plays a major role, one widely adopted key performance indicator (value) is the so called "Overall Equipment Efficiency" (OEE) that basically speaking is expressing (by means of a percent figure) the overall effectiveness of the operations running on some given equipment. This figure takes in account factors affecting the equipment availability (efficient usage of a available time), performance (efficient usage of a machine productivity) and quality (effectiveness in producing good products/parts/units), with the overall efficiency figure expressed as:

OEE=Availability×Performance×Quality,

Where:

Availability=Available Time/Scheduled Time,

Performance=(Parts Produced*Ideal Cycle Time)/Available Time

Quality=Good Units/Total Units.

More generally speaking, the term "OEE" as an extended meaning can also stand for an entire set of key performance indicators measuring not only the above described OEE figure itself but also other related factors like Availability Rate, Performance Rate, Quality Rate, MTBF (Mean Time Between Failure), MTTF (Mean Time To Failure), MTTR (Mean Time To Repair), MTTA (Mean Time To Assist), MTBA (Mean Time Between Assist), and so on. The computation of such measurements requires an exact and detailed knowledge of equipment run times as well as of reasons for planned and unplanned equipment downtimes/drawbacks over an observation period referring to these measurements.

Many software systems for managing manufacturing operations offer the ability to perform OEE calculations in real time, and their functionality enables operators/controllers to identify problems which could impact the performance of a production line, so that it is possible to respond immediately to correct such a situation (such as a jam upstream in the process), and return to an expected level of efficiency in order to reduce costs related to unplanned downtime. A preferred implementation of such OEE calculations is hence commonly embedded in a specific software module of a Manufacturing Execution System (MES), because the MES system is capable to provide to the operators/controllers a real-time visibility on plant operations at the right level of detail to effectively monitor and control a production flow.

1.3 Problem in Collecting Data Required for a OEE Based Computation

A prerequisite for implementing a OEE based computation is the ability to collect data from a running process to exactly know when the equipment has been productive and when it was not. A set of real-time machine status data is collected to discriminate which part of the equipment time during a conventional observation period has been spent in productive operations and how much time has been wasted for some non productive reasons.

This can be easy in case of automated machines driven by standard programmable control logic (also commonly known under PLC or SCADA): in this case the PLC itself or a SCADA system that is collecting real-time process data is/are able to provide required information about equipment status to a module running the OEE computation software by some standard or easily customizable interfaces.

Problems can arise however with older or not compatible equipment, with machines that do not provide standard data interfaces or with machines having an uncertain documented control logic. In this case the cost of customizing an interface for collecting machine status information required for the computation of equipment uptime and downtime can be relevant. Often the technical details of such equipment and the related control logic are not available in electronic form and to implement such interfaces it is required to go through schemas and blueprints in printed form that can be old, imprecise and not up to date. When a standard interface is not available for the equipment to be monitored it is often required to physically tamper the machine control circuits to gather some signals that can be used by other PLC and SCADA to feed the OEE computation logic with machine status information about machine start/stop, fault signals and product waste. This operation can require extra costs and risks for each one of the equipment that has to be monitored.

It is not uncommon for a company to have a productive shop floor with hundreds of such equipment and in this case the cost of pure interfacing all the machines can be soaring, making the investment in OEE computation much less profitable. In some cases an additional problem can be related to the machine's compliance with safety regulations (that can be related to obligatory certifications), because such regulations can also be subject to periodical updates. Once a machine has been certified for safety under an older regulation, this certification can usually be extended to a new updated regulation, but an attempt to tamper the equipment for gathering the machine status data by other means than a standard interface can be considered like a revamping of the machine itself, which requires to re-certify the entire equipment under the new regulation and this can be costly.

1.4 Solution from Prior Art

Almost all commercially available OEE computing systems basically provide following ways or modes to collect status data of a machine which deliver information required for the computation of the key performance OEE related indicators.

a) AUTOMATIC DATA CAPTURE MODE: Machine status data are electronically collected from the equipment by a dedicated (standard or customized) interface, capable to provide automatic feeds to a OEE based logic unit to monitor machine start/stop, fault signals and product waste.

b) MANUAL DATA CAPTURE MODE: Machine status data cannot be automatically and electronically read by some interface thus they are manually declared by the machine operator. This can be done either by writing all times of machine stop and start on paper form and later insert these data manually in the system (paper based manual data capture) or by having a dedicated user interface near the machine to be monitored (paperless manual data capture), that allows the operator to directly declare on an electronic form each status change of the equipment itself during the machine run as soon this status is changing.

c) COMBINED AUTOMATIC AND MANUAL DATA CAPTURE MODES: the data automatically collected according to the above point (a) are integrated with some additional input manually provided by the operator on an electronic form to add meaningful information about the cause of the stoppage. This method has the advantage of actively involving the operator providing to him direct feedbacks about real-time performance of the current machine run.

For machines or coactive (and may be partially non OEE-compatible) equipments that do not provide a suitable electronic interface, the problem under point (1.3) is solved neither by the mode (a) nor by modes (c) and the only possible solution is to manually provide start/stop and machine status data according to mode (b). This solution could be hence not suitable for fast paced production rates and could also be imprecise and error prone because the accuracy of manual data capture is affected by:

a) missing or ignored minor stoppages,
b) operators, busy fixing problems, struggling to record lost time accurately,
c) recording the exact timing of production start-stop can be complex to do manually, and
d) in case of paper-based data capture, paper-work on the factory floor can get lost, damaged and requires additional manual handling and processing.

Especially, these problems rely for a dynamical arrangement of pieces (like mechanical parts/products of a machine or of coactive equipment in a manufacturing line) taking part in a process related to a manufacturing executing system (MES), wherein at least one of the pieces is spatially movable and the arrangement is free of interfacing signals for signaling a spatial position of the pieces at a control unit of manufacturing executing system.

SUMMARY OF THE INVENTION

An object of the invention is to provide an autonomous OEE-compatible monitoring system for any kind of dynamical arrangement of pieces, e.g. involved in a manufacturing process, wherein the arrangement presents a lack of interfacing devices so that at least an automatically monitoring is not possible, not convenient or not economical with usual measures, especially if such arrangement or coactive equipment are free of interfacing signals transmitting relevant information for OEE indicators.

The invention proposes a monitoring system of a dynamical arrangement of pieces taking part in a manufacturing process that relates to or at least is adapted for being supervised by a manufacturing executing system (MES). At least one of the pieces is spatially movable and the arrangement is free of interfacing signals for signaling a spatial position of the pieces at a control unit of manufacturing executing system. The monitoring system contains at least one camera which is spatially positionable in a free selected neighborhood close to predefined pieces and which acquires at least one image of a field of interest of the dynamical arrangement, a motion detection unit that provides a detection of a spatial motion of at least one of the pieces, and an interface at an output of the camera for processing and transmitting the acquired image to an input of a monitoring unit in order to extract information on a status of the arrangement which is interpretable in the control unit of the manufacturing executing system.

As previously mentioned the arrangement contains any kind of equipment or associations thereof wherein a lack of interfacing devices is existing so that at least an automatically (interfaceable) monitoring is not possible, or even if physically possible is too complicated or not economical.

Due to the components of the monitoring systems it is hence advantageously possible to making learn the detection unit to recognize (under a certain admissible tolerance) a status by a position or a movement of one or more pieces of the arrangement. By this way, after this learning step the monitoring systems can work autonomously in order to deliver the expected status. Even if some machines are working coactively, the field of interest of the monitoring systems can be so selected that it overlaps some significant parts of each one of the machines whose controllers and/or own monitoring tools are completely independent. By this way it can be for example easy and autonomously monitored if the machines are working coactively like in a synchronic manner or not.

It is also possible to use one or some pre-installed camera in the neighborhood of machines and to connect and drive it/them as they were part of the monitoring systems according to the invention.

Furthermore, the monitoring systems can be used in many advantageous manners, in that:

a) an indicator value (like a OEE based one for a reliable monitoring related to a manufacturing execution system) of availability, performance and quality of a process involving the arrangement is calculated from the information on the status of the arrangement;
b) the information on the status of the arrangement is monitorable in an automatical mode or/and in addition to a manual operating mode;
c) the information on the status of the arrangement is transmitted to an alarm unit, ideally for preventing an manual operator from a drawback of MES based process, for assisting automatically a part of drawbacks in addition to a manual MES based process control and for controlling fully automatically a further compensation of drawbacks in a MES based process; and
d) the information on the status of the arrangement is recorded on a memory support so that a tracing of monitored failures can be observed.

Furthermore, a computer program element can be provided, containing computer program code for performing steps of driving the camera, the motion detection unit and the control unit according to the above mentioned monitoring system when loaded in a digital processor of a computing device (e.g. at the manufacturing executing system).

Finally, a computer program product stored on a computer usable medium can be provided, containing computer readable program code for causing a computing device to perform the monitoring of the monitoring system according to the invention.

Other features which are considered as characteristic for the invention are set forth in the appended claims.

Although the invention is illustrated and described herein as embodied in a monitoring system of a dynamical arrangement of pieces taking part in a process related to a manufacturing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
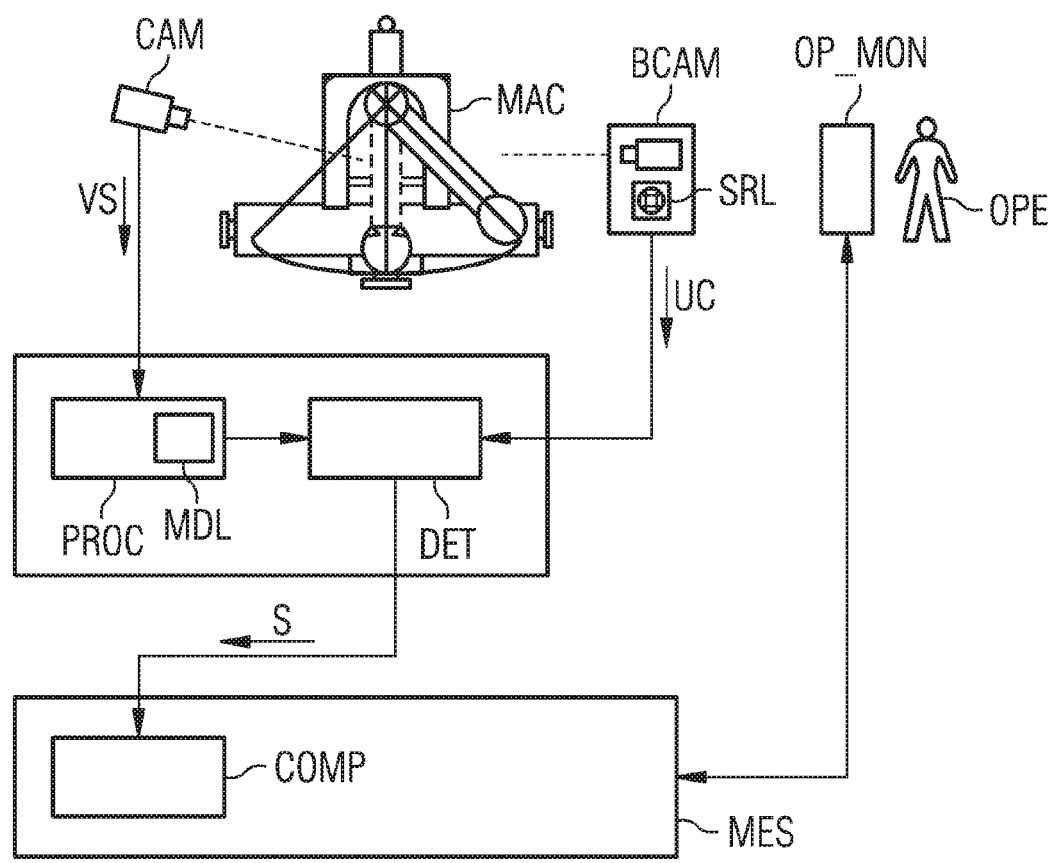
FIG. 1 is an illustration showing an example of a first monitoring system according to the invention.

Referring now to the figures of the drawing in detail and first, particularly, to FIG. 1 thereof, there is shown a first monitoring system (adapted for monitoring) of a dynamical arrangement MAC of pieces taking part in a process related to a manufacturing executing system MES, wherein at least one of the pieces is spatially movable and the arrangement is free or at least fails of interfacing signals for signaling a spatial position of the pieces at a control unit COMP of a manufacturing executing system MES that should provide an OEE based indicator value issue from the monitoring. Usually a manual operator OPE is also controlling such indicators by means of a second monitoring station OP_MON connected to the MES (see also the monitoring modes according to points b and c from prior art). The monitoring systems according to the invention can now better support or completely replace the operator's work in that it will furnish a higher or complete amount of information necessary to ensure a extended monitoring/overview of MES-regulated process.

The monitoring system according to the invention contains the now described further components.

At least one camera CAM which is spatially positionable in a free selected neighborhood close to predefined pieces or parts of the machine/products/arrangement MAC and which acquires at least one image VS of a field of interest of the dynamical arrangement.

A motion detection unit MDL that provides a detection of a spatial motion of at least one of the pieces.

An interface PROC at an output of the camera CAM for processing and transmitting the acquired image to an input of a monitoring unit in order to extract information on a status of the arrangement which is interpretable in the control unit COMP of the manufacturing executing system MES.

Preferably the camera is a video camera, because a single motion sensor (or another sensor of light barriers) could for example introduce a possible uncertainty on which piece is really in motion and should be considered as giving relevant information for ensuring that the expected status will be delivered. By this way such a video signal from a camera can provide a start/stop status on a process related to the arrangement, but it can also provide more information like a speed of execution (for a production rate) by associating image processing means that can be contained in the interface PROC. Other video based information (after an adapted artificial vision processing) can be an advantageous source of other indicators values such as a count of products/units produced by the arrangement per time unit in video frames. Production quality and/or product waste can be inferred by sophisticated image recognition algorithms capable to discriminate shapes of pieces/products/units/ . . . or all other "parts" for example to inform on good and defective parts, or in a straightforward way by some much simpler counts of pieces/products/units/ . . . .

In a further embodiment of the invention the monitoring system can include that the motion detection unit MDL contains or is completed by at least one of following now described components.

Like in FIG. 1, at least one further basic optical sensor with a shape recognition logic SRL like a (low-cost) camera BCAM, so that outputs data of interface PROC and the logic SRL are inputted in a machine status detection logic DET which outputs a machine status signal S to a OEE computation module (=control unit COMP for monitoring in the MES).

Figure 2:
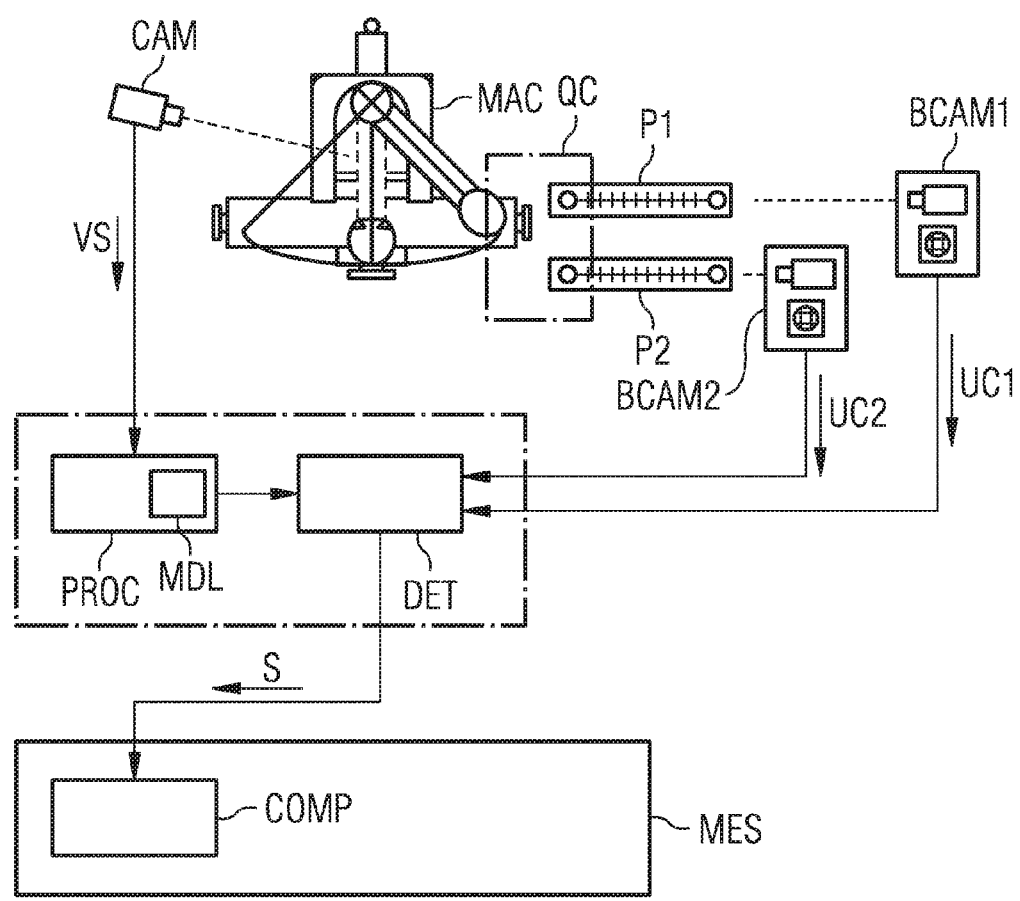
FIG. 2 is an illustration showing an example of a second monitoring system according to the invention.

Like in FIG. 2, a counter device QC for counting pieces in motion on at least one path and generally two paths P1, P2, (for example P1=good products path and P2=defective products path) each of them being monitored by a further basic optical sensor with a shape recognition logic SRL like a (low-cost) camera BCAM1, BCAM2. This way of proceeding provides alternate paths which allow a counter's signals UC1, UC2 of good and defective products that are manufactured by the machine or arrangement MAC.

Figure 3:
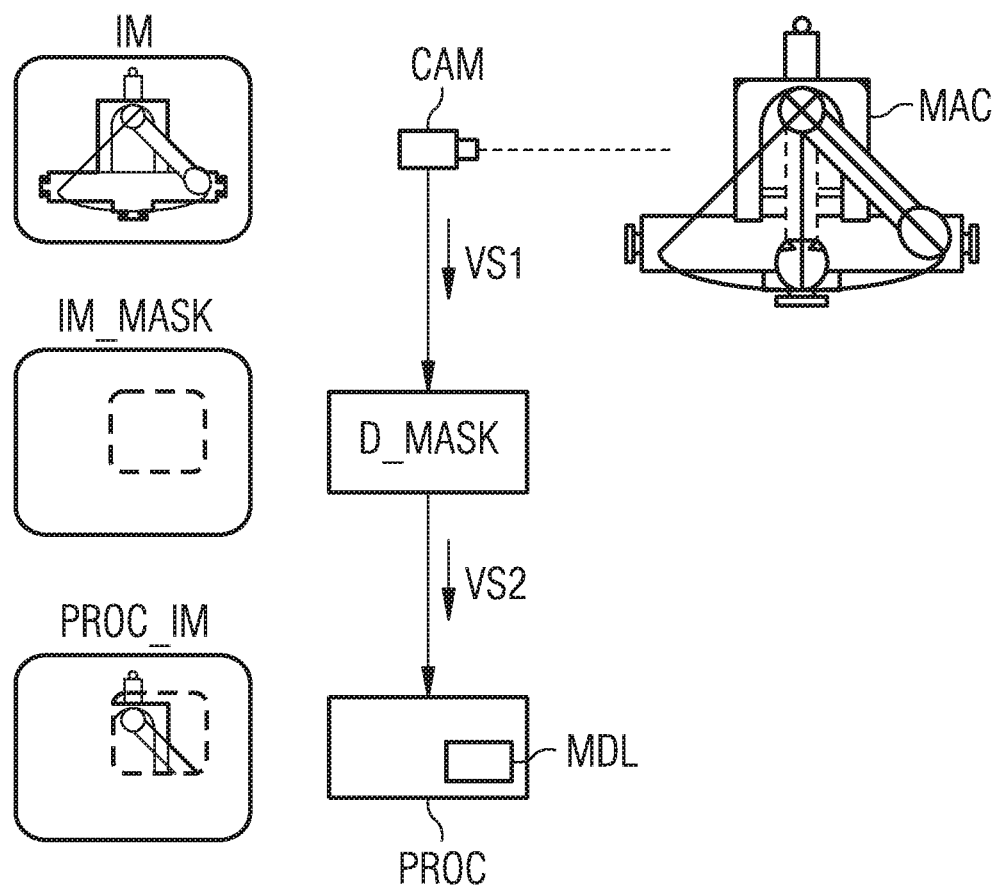
FIG. 3 is an illustration showing a mean for well adapting a field of interest of the monitoring system according to the invention.

The interface PROC with an image processor can be configured by applying appropriate digital "masks" in order to ignore/filter or limit some part of the captured images and to focus only on the portions of image that is relevant for the purpose of detecting the machine conditions. This is presented in FIG. 3. Depending on the technology used for implementing an artificial vision algorithms, some "training" session with the running equipment can be required to achieve optimal results of outputting only relevant information and no artefacts. Generally, the field of interest of an image IM is geometrically adjustable by use of a digital mask IM_MASK that filters at least one region of interest from the image IM. Only a restricted region PROC_IM has hence to be processed in the interface PROC so that the speed of processing or the flow of transmitted data VS1, VS2 can be also enhanced, especially by high speeds of arrangement's dynamics.

The monitoring system according to the invention can be also provided such that at least the camera CAM and the interface PROC at the output of the camera are installed on a mobile support. By this way, a method of installing the monitoring system is very advantageous in that an operator can easily install at a free selectable monitoring location of a production line a provisional (or permanent) spot of monitoring. Furthermore, at least a wireless connection path can be also provided between the camera CAM (or the interface PROC) and the control unit COMP of the manufacturing executing system MES. By this way, no interfacing cable has to be installed between the location of physical monitoring and the actual MES. This is particularly interesting in arrangement with large motion or within a confinement wherein cable are not easy to be placed, or have to follow a certain motion to ensure a capture of the field of interest.

Another advantage of the monitoring system according to the invention relies in that camera of usual survey of a production line can be also used as smart camera CAM for initiating a further local motion detection. This can be provided if the output signal(s) of camera(s) are redirected to processing/recognition modules that could be part of the computation module COMP of MES. By this way, an operator could select a field of interest at a plant survey camera directly from the platform of MES and let further extract the information status he is requiring a first time manually and in the future in a fully autonomous way as the survey camera is positioned on the required field of interest.

The invention claimed is:

1. A configuration comprising:
   a monitoring system of a dynamical arrangement of pieces taking part in a process related to a manufacturing executing system, wherein at least one of the pieces is spatially movable, the monitoring system including:
      a control unit configured for monitoring in the manufacturing executing system, said control unit including an Overall Equipment Efficiency computation module;
      at least one camera being spatially positionable adjacent the predefined pieces, said camera configured to acquire at least one image of a field of interest of the dynamical arrangement, said camera having an output;
      a motion detection unit connected to said output of said camera and to provide a detection of a spatial motion of at least one of the pieces;
      machine status detection logic configured for outputting a machine status signal to said Overall Equipment Efficiency computation module; and
      an interface connected to said output of said camera and to said machine status detection logic for transmitting the image acquired by said camera to said machine status detection logic;
   wherein the configuration includes the dynamical arrangement and the dynamical arrangement does not have interfacing signals for signaling a spatial position of the pieces to said control unit.

2. The configuration according to claim 1, wherein said camera is a video camera.

3. The configuration according to claim 1, wherein said motion detection unit has at least one of:
   at least one further basic camera with a recognition logic; or
   a counter means for counting the pieces in motion on at least one path.

4. The configuration according to claim 1, further comprising a digital mask, the field of interest is geometrically adjustable by means of said digital mask that filters at least one region of interest from the image.

5. The configuration according to claim 1, further comprising a mobile support, at least said camera and said interface at said output of said camera are installed on said mobile support.

6. The configuration according to claim 1, wherein at least a wireless connection path is provided between said camera and the control unit of the manufacturing executing system.

7. The configuration according to claim 1, wherein said camera is selected from the group consisting of a smart camera and a plant survey camera.

8. A method of using a monitoring system of a dynamical arrangement of pieces taking part in a process related to a manufacturing executing system, wherein at least one of the pieces is spatially movable and the dynamical arrangement does not have interfacing signals for signaling a spatial position of the pieces to a control unit of a manufacturing executing system, the method which comprises the steps of:
   providing a control unit configured for monitoring in the manufacturing executing system, providing the control unit with an Overall Equipment Efficiency computation module, and providing at least one camera being spatially positionable adjacent the predefined pieces;
   with the camera, acquiring at least one image of a field of interest of the dynamical arrangement;
   with a motion detection unit connected to an output of the camera, detecting a spatial motion of at least one of the pieces;
   in the interface, obtaining the image acquired by the camera and transmitting the image acquired by the camera to a machine status detection logic; and
   in the machine status detection logic, obtaining the image acquired by the camera from the interface and outputting a machine status signal to an Overall Equipment Efficiency computation module of the control unit.

9. The method according to claim 8, which further comprises:
   in the control unit, calculating an indicator value of availability, performance and quality of a process involving the dynamic arrangement from the information on a status of the dynamical arrangement;
   wherein the information on the status of the dynamical arrangement is monitorable in an automatic mode or/and in addition to a manual operating mode.

10. The method according to claim 8, which further comprises:
   in the control unit, calculating an indicator value of availability, performance and quality of a process involving the dynamic arrangement from the information on a status of the dynamical arrangement;
   wherein the information on the status of the dynamical arrangement is transmitted to an alarm unit, ideally for preventing an manual operator from a drawback of MES based process, for assisting automatically a part of drawbacks in addition to a manual MES based process control and for controlling fully automatically a further compensation of drawbacks in a MES based process.

11. The method according to claim 8, which further comprises:
   in the control unit, calculating an indicator value of availability, performance and quality of a process involving the dynamic arrangement from the information on a status of the dynamical arrangement; and
   recording the information on the status of the dynamical arrangement on a memory support.

* * * * *